UNITED STATES PATENT OFFICE.

ALFRED MEYER, OF MÜLHAUSEN, GERMANY.

PROCESS OF PREPARING MEDICAMENTS.

948,930.      Specification of Letters Patent.      Patented Feb. 8, 1910.

No Drawing.      Application filed July 7, 1909. Serial No. 506,415.

*To all whom it may concern:*

Be it known that I, ALFRED MEYER, residing in the town of Mülhausen, Alsace, German Empire, have invented certain new and useful Improvements in Processes of Preparing Medicaments; and I do hereby declare the following to be a full, clear, and exact description of the invention, such as will enable others skilled in the art to which it appertains to make and use the same.

This invention relates to processes of preparing medicaments; and it comprises a process of producing a permanent solution or soluble preparation of therapeutic value which embraces the steps of preparing an extract of cinchona bark containing cinchotannic acid and the addition thereto of a soluble iron compound in excess; all as more fully hereinafter set forth and as claimed.

The solutions obtained by treating the various cinchona barks with water contain in addition to the alkaloids other bodies of therapeutic value, such as cinchotannic acid. Upon treating these solutions with iron salts, the result is either the production of a green color or the formation of a precipitate. A green color is obtained by the addition of ferric chlorid or ferric sulfate while a yellow or brownish yellow precipitate is obtained on the addition of ferric oxychlorid or ferric ammonium phosphate as well as by the additional solutions of most of the organic salts of iron, such as ferric citrate or ferric tartrate. It has been discovered that the precipitates thus formed from extracts of cinchona bark may be re-dissolved in an excess of the iron salt used to form them or in ammonium salts, and particularly in salts containing both iron and ammonium. This reaction renders possible the production of permanent solutions of therapeutic value containing both iron salts and cinchotannic acid. The permanence of such a solution depends primarily upon the excess of iron salt present and particularly in the presence of an ammonium salt. But the concentration and the nature of the extract of cinchona bark used have some influence. The best results are obtained from aqueous extracts prepared at ordinary temperatures whereas alcoholic extracts and aqueous extracts made with the aid of heat are less suitable. It is moreover desirable to remove preliminarily the cinchona red from the solutions, as this substance also precipitates iron salts and has no value therapeutically. In its presence the amount of iron required to maintain the solution is increased without advantage. The removal of cinchona red from the aqueous extract can be effected by the well known means, such as precipitation by magnesia or lime water or by a fractional precipitation with ammonium citrate. Cinchona red forms an insoluble compound with the alkaline earths.

The presence of organic substances, such as the various alcohols, glycerin, tartaric, citric or other organic acids or of phosphoric acid, sugar, glucose, etc., considerably increases the solvent power of iron salts upon cinchotannic acid and admits of the production of permanent solutions containing a high ratio of cinchotannic acid to iron. These substances also have a favorable influence upon the permanence of the resultant solution.

As a typical specific embodiment of my new process of preparing medicaments I may adduce the following. First prepare an extract of cinchona bark with water. For example, an aqueous extract may first be made of 500 grams of cinchona bark, such as succirubra bark containing about 9 per cent. cinchotannic acid, by soaking the quantity given in 500 grams of water. After the mixture of bark and water has stood for about 48 hours, the extract and the residue are separated in the ordinary manner, the residual bark being washed with water until 1000 cubic centimeters of extract are obtained. After allowing the extract to stand for 24 hours and precipitating the cinchona red from it, it is ready for use. The precipitation of the cinchona red may be effected in any of the ordinary ways as by the addition of magnesia or lime water. With 50 cubic centimeters of the extract so obtained may now be mixed a solution containing 5 grams of ferric ammonium citrate, 600 cubic centimeters of water, 200 cubic centimeters of alcohol and 300 grams of cane sugar. The ferric ammonium citrate employed may be that prepared according to the *Pharmacopœia Helvetica III*. Sufficient water is added to the mixture to bring the volume to a liter. The preparation is now ready for use. Or 200 grams of saccharate of iron (see *Pharmacopœia Germanica IV*) may be dissolved in 100 cubic centimeters of water, filtered, and mixed with 120 cubic centimeters of 95 per cent. alcohol. To this mixture may be added 10 grams of ammonium citrate and 200 cubic centimeters of the cinchona bark extract obtained as described. Upon the addition of sufficient water to dilute the mixture to a liter the preparation is ready for use. Or 125 cubic centimeters of the described cinchona bark extract may be simply added to 200 cubic centimeters of a solution of oxychlorid of iron (see *Pharmacopœia Germanica IV*) and the mixture diluted to a liter.

What I claim is:—

1. The process of preparing a medicament which comprises forming an extract of cinchona bark substantially free of cinchona red and adding a solution comprising a salt of iron, said iron being in amount at least sufficient to prevent the precipitation of cinchotannic acid.

2. The process of preparing a medicament which comprises forming an extract of cinchona bark with water at the ordinary temperature, removing cinchona red therefrom and adding a solution comprising a dissolved salt of iron, said iron being in amount at least sufficient to prevent the precipitation of cinchotannic acid.

3. The process of preparing a medicament which comprises forming an extract of cinchona bark with water at the ordinary temperature and subsequently treating with a solution comprising a dissolved salt of iron, said iron being in amount at least sufficient to hold the cinchotannic acid in solution.

4. The process of preparing a medicament which comprises treating a substance comprising cinchotannic acid but substantially free of cinchona red with a solution comprising a dissolved salt of iron, said iron being in amount at least sufficient to hold said cinchotannic acid in solution.

5. The process of preparing a medicament which comprises preparing an extract of cinchona bark with water at the ordinary temperature, removing the cinchona red therefrom and adding to the extract a solution comprising a dissolved salt of iron, said salt being in amount greater than is required to precipitate said cinchotannic acid.

6. The process of preparing a medicament which comprises treating a substance comprising cinchotannic acid but substantially free from cinchona red with a solution containing an iron salt and substances having a solvent power upon iron salts, said solution being in amount sufficient to retain the cinchotannic acid in solution.

7. The process of making a medicament which comprises preparing an extract of cinchona bark containing dissolved tannin but substantially free of cinchona red and adding a solution comprising a dissolved iron salt in sufficient quantity to redissolve the iron tannate at first precipitating.

In testimony whereof I affix my signature, in presence of two witnesses.

ALFRED MEYER.

Witnesses:
CARL W. SCHMITT,
AUGUST OOSTERMAN.